United States Patent [19]
Gunn et al.

[11] Patent Number: 6,066,594
[45] Date of Patent: May 23, 2000

[54] IDENTIFICATION DOCUMENT

[75] Inventors: Valerie E. Gunn, Revere, Mass.; Janet M. Schaffner, Cape Neddick, Me.

[73] Assignee: Polaroid Corporation, Cambridge, Mass.

[21] Appl. No.: 09/157,072

[22] Filed: Sep. 18, 1998

[51] Int. Cl.[7] .............................. B41M 5/035; B41M 5/38
[52] U.S. Cl. ..................... 503/227; 427/152; 428/195; 428/913; 428/914
[58] Field of Search ................... 8/471; 427/146, 427/152; 428/195, 913, 914; 503/227

[56] References Cited

U.S. PATENT DOCUMENTS

| | | | |
|---|---|---|---|
| 3,758,970 | 9/1973 | Annenberg | 40/2.2 |
| 4,653,862 | 3/1987 | Morozumi | 350/339 F |
| 5,171,625 | 12/1992 | Newton | 428/195 |
| 5,267,755 | 12/1993 | Yamauchi et al. | 283/86 |
| 5,334,573 | 8/1994 | Schild | 503/227 |
| 5,336,657 | 8/1994 | Egashira et al. | 503/227 |
| 5,380,695 | 1/1995 | Chiang et al. | 503/227 |
| 5,387,013 | 2/1995 | Yamauchi et al. | 283/86 |
| 5,579,694 | 12/1996 | Mailloux | 101/488 |

FOREIGN PATENT DOCUMENTS 479295   4/1992   European Pat. Off. .

*Primary Examiner*—Bruce H. Hess
*Attorney, Agent, or Firm*—David J. Cole

[57] ABSTRACT

An over-the-counter type identification document is prepared by forming at least one first indicium (typically invariant data common to a large number of identification documents) on a core layer, sandwiching this core layer between a pair of substantially transparent polymer layers, providing an image-receiving layer on one or both outer surfaces of the resulting sandwich, forming a second indicium (typically variable data relating only to a single identification document) on the image-receiving layer(s) and laminating a protective layer or layers over the image-receiving layer(s). The identification document displays improved durability and security and can be rendered substantially identical in appearance to documents produced by known central issue production methods.

12 Claims, 1 Drawing Sheet

6,066,594

IDENTIFICATION DOCUMENT

BACKGROUND OF THE INVENTION

This invention relates to an identification document. More specifically, this invention relates to an over-the-counter identification document which is less susceptible to cracking than previous identification documents of this type, and which can be made to closely resemble a central issue identification document.

Many types of identification cards and documents, such as driving licenses, national or government identification cards, bank cards, credit cards, controlled access cards and smart cards, carry thereon certain items of information which relate to the identity of the bearer. The most important items of information are name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "identification documents".

Commercial systems for issuing identification documents are of two main types, namely "on-the-spot" or "over-the-counter" (OTC) issue, and "central" issue; as the name implies, the former are issued immediately to a bearer who is present at a document-issuing station, whereas with the latter type, a bearer reports to a document station where data is collected, the data are forwarded to a central location where the card is produced, and the card is forwarded to the bearer, often by mail.

Centrally issued digital identification documents generally comprise an opaque laser or ink jet printed core material, typically either paper or plastic, sandwiched between two layers of clear plastic laminate, typically polyester, to protect the aforementioned items of information from wear, exposure to the elements and tampering. The materials used in such centrally issued digital identification documents can offer the ultimate in durability. In addition, centrally issued digital identification documents generally offer a higher level of security than digital OTC identification documents because they offer the ability to pre-print the laser or ink jet printed core of the central issue document with "micro-printing", ultra-violet security features, security indicia and other features currently unique to centrally issued identification documents.

Digital OTC identification documents of the types mentioned above are generally comprised of highly plasticized poly(vinyl chloride) or have a composite structure with polyester laminated to highly plasticized 0.5–2.0 mil (13–51 $\mu$m) poly(vinyl chloride) film, which provides a suitable receiving layer for heat transferable dyes which form a photographic image, together with any variant or invariant data required for the identification of the bearer. These data are subsequently protected to varying degrees by clear, thin (0.125–0.250 mil, 3–6 $\mu$m) overlay patches applied at the printhead, holographic hot stamp foils (0.125–0.250 mil 3–6 $\mu$m), or a clear polyester laminate (0.5–10 mil, 13–254 $\mu$m) supporting common security features; these last two types of protective foil or laminate are applied at a laminating station separate from the printhead. The choice of laminate dictates the degree of durability and security imparted to the system in protecting the image and other data. Although such OTC documents are in wide use throughout the world, they suffer from several disadvantages. Both the highly plasticized poly(vinyl chloride) type and the polyester/poly(vinyl chloride) composite type become embrittled over time because of migration of the plasticizers, thus reducing the resistance of the document to cracking; such cracking renders the card unusable and vulnerable to tampering. The data described above which are crucial to the identification of the bearer are often covertly repeated on the document in encrypted form for data verification in a magnetic stripe, bar code, radio frequency module or integrated circuit chip. The inability to retrieve such data due to cracking renders the document invalid. In addition, many of the polyester/poly (vinyl chloride) composite documents have exhibited extreme sensitivity to combinations of heat and humidity, as evidenced by delamination and curling of the document structure.

The present invention provides an identification document which can be issued over the counter, which can be made to mimic the appearance of a central issue card, and which reduces or eliminates the aforementioned problems encountered with prior art OTC documents.

SUMMARY OF THE INVENTION

Accordingly, this invention provides an identification document comprising:

a core layer bearing at least one indicium thereon;

two layers of a substantially transparent polymer fixed to the core layer on opposed sides thereof; and at least one image-receiving layer capable of being imaged by dye diffusion thermal transfer, the image-receiving layer being fixed to one of the layers of substantially transparent polymer on the side thereof remote from the core layer.

This invention also provides a process for preparing an identification document, which process comprises:

forming at least one first indicium upon a core layer;

affixing to the indicium-carrying core layer two layers of substantially transparent polymer, one of these layers being affixed to each surface of the core layer;

providing, on one of the layers of substantially transparent polymer, on the side thereof remote from the core layer, an image-receiving layer capable of being imaged by dye diffusion thermal transfer;

printing by dye diffusion thermal transfer at least one second indicium on the image-receiving layer, this second indicium being different from the first indicium on the core layer; and affixing a protective layer over the image-receiving layer bearing the second indicium.

DETAILED DESCRIPTION OF THE INVENTION

Figure 1:
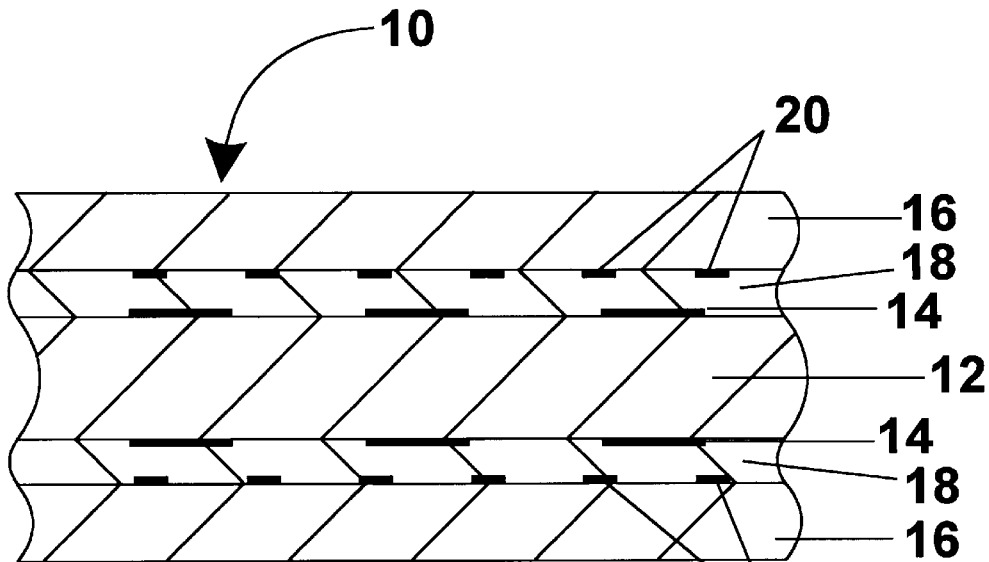
FIG. 1 of the accompanying drawings shows schematically a cross-section through a finished prior art central issue identification document.

As already mentioned, in the process of the present invention the first step is forming at least one first indicium upon the core layer. In order to provide an identification document having a bright white background and good color rendition, it is generally preferred that the core layer be formed from an opaque sheet of printable silica-filled polyolefin, such as the materials sold commercially by PPG Industries, Inc., Pittsburgh, Pa. under the Registered Trade Mark "TESLIN" sheet. The first indicium or indicia, which are typically the invariant information common to a large number of identification documents, for example the name and logo of the organization issuing the documents, may be formed by any known process capable of forming the indicium on the specific core material used However, since it is usually desired to provide numerous copies of the first indicium on a large area of core layer material (in the form of a large sheet or web) in order to allow the preparation of a large number of "blank" documents at one time, a printing process such as color laser printing, is normally used to apply the first indicium. A modified laser printer useful for forming the first indicium in the present process is described in U.S. Pat. No. 5,579,694. First indicia may be provided on both surfaces of the core layer; for example, it is often convenient to provide one or more first indicia intended for human reading of the core layer surface which becomes the front of the completed identification document, and one or more additional first indicia intended for machine reading (e.g., bar codes) on the opposed "back" surface of the core layer.

As already indicated, the term "indicium" as used herein to cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, the first indicium on the core layer of the present identification document (and the second indicium discussed below) may be partially or wholly in the form of a marking visible only under non-visible radiation. Markings comprising, for example, a visible "dummy" image superposed over a non-visible "real" image intended to be machine read may also be used.

Following the printing of the first indicium, the two layers of substantially transparent polymer are affixed to the core layer. Depending upon the material used for the core layer, the process used to produce the first indicium and the type of substantially transparent polymer employed, fixation of the polymer layers to the core layer may be effected by heat and pressure alone. However, it is generally preferred to provide an adhesive layer on each polymer layer to improve its adhesion to the core layer. This adhesive layer may be a polyester, polyester urethane, polyether urethane or polyolefin hot melt or ultraviolet or thermally cured adhesive, and the adhesive may be coated, cast or extruded on to one surface of the polymer sheet. The polymer layers themselves may be formed from any polymer having sufficient transparency, for example polyester, polycarbonate; polystyrene, cellulose ester, polyolefin, polysulfone, or polyimide. Either an amorphous or biaxially oriented polymer may be used. Two specific preferred polyesters for use in the process of the present invention is poly(ethylene terephthalate) (PET), which is readily available commercially, for example from ICI Americas Inc., Wilmington, Del. 19850 under the Registered Trade Mark "MELINEX", and poly(ethylene terephthalate glycol) (PETG), which is readily available commercially from Eastman Kodak Chemical, Kingsport, Tenn. The polymer layers provide mechanical strength to the image-receiving layer or layers and hence to the image(s) in the finished document. The thickness of the polymer layers is not critical, although it is generally preferred that the thickness of each polymer layer (including the thickness of its associated adhesive layer, if any) be at least about 0.1 mm, and desirably is in the range of from about 0.125 to about 0.225 mm. Lamination of the polymer layers to the core layer may be effected by any conventional lamination process, and such processes are well-known to those skilled in the production of identification documents.

The image-receiving layer of the present identification document may be formed from any material capable of receiving an image by dye diffusion thermal transfer. However, very desirably the dye diffusion thermal transfer printing step of the present process is effected by the process of U.S. Pat. No. 5,334,573. This patent describes a receiving sheet or layer which is comprised of a polymer system of which at least one polymer is capable of receiving image-forming materials from a donor sheet upon the application of heat thereto, the polymer system of the receiving sheet or layer being incompatible or immiscible with the polymer of the donor sheet at the receiving sheet/donor sheet interface so that there is no adhesion between the donor sheet and the receiving sheet or layer during printing. In addition, the polymer system of the receiving sheet or layer can be substantially free from release agents, such as silicone-based oils, poly(organosiloxanes), fluorinated polymers, fluorine- or phosphate-containing surfactants, fatty acid surfactants and waxes. The present process may employ any of the donor sheet/image-receiving layer combinations described in this patent. Suitable binder materials for the dyes which are immiscible with the polymer system of the image-receiving layer include cellulose resins, cellulose acetate butyrate, vinyl resins such as poly(vinyl alcohol), poly(vinylpyrrolidone) poly(vinyl acetate), vinyl alcohol/vinyl butyrate copolymers and polyesters. Polymers which can be used in the image-receiving layer and which are immiscible with the aforementioned donor binders include polyester, polyacrylate, polycarbonate, poly(4-vinylpyridine), poly(vinyl acetate), polystyrene and its copolymers, polyurethane, polyamide, poly(vinyl chloride), polyacrylonitrile, or a polymeric liquid crystal resin. The most common image-receiving layer polymers are polyester, polycaprolactone and poly(vinyl chloride). Processes for forming such image-receiving layers are also described in detail in this patent; in most cases, the polymer(s) used to form the image-receiving layer are dissolved in an organic solvent, such as methyl ethyl ketone, dichloromethane or chloroform, and the resultant solution coated on to the polymer layer using conventional coating apparatus, and the solvent evaporated to form the image-receiving layer. However, if desired the image-receiving layer can be applied to the polymer layer by extrusion casting, or by slot, gravure or other known coating methods.

Thus, the image-receiving layer can be produced by a one-step process, and since no post-coating crosslinking is necessary, the dye densities in the image eventually formed upon the image-receiving layer are not compromised. Furthermore, since no heat other than the moderate heat required to transfer the dye from the donor sheet to the image-receiving layer and to dry the image on this layer is needed, thermal distortion of the core and polymer layers is avoided. Also, since the polymer systems described in U.S. Pat. No. 5,334,573 lack a silicone oil or other low surface energy release agent, lamination of the image-receiving layer to other materials is facilitated.

The identification documents of the present invention may have only a single image-receiving layer, but is generally preferred that they have two image-receiving layers, one such layer being provided on each layer of polyester on the side thereof remote from the core layer. Typically, one or more second indicia intended for human reading may be printed on the image-receiving layer on the front side of the identification document, and one or more additional second indicia intended for machine reading (for example, bar codes) may be printed on the image-receiving layer on the back side.

Following the printing of the second indicia on the image-receiving layer, a protective layer is affixed over at least the portion of the or each image-receiving layer carrying the second indicia; this protective layer serves to protect the relatively fragile image-receiving layer from damage, and also prevents bleeding of the thermal transfer dye from the image-receiving layer. Materials suitable for forming such protective layers are known to those skilled in the art of dye diffusion thermal transfer printing and any of the conventional materials may be used provided they have sufficient transparency and sufficient adhesion to the specific image-receiving layer with which they are in contact and block bleeding of dye from this layer. Typically, the protective layer will be a biaxially oriented polyester or other optically clear durable plastic film.

The protective layer desirably provides additional security features for the identification document. For example, the protective layer may include a low cohesivity polymeric layer, an optically variable ink, an image printed in an ink which is readable in the infra-red or ultraviolet but is invisible in normal white light, an image printed in a fluorescent or phosphorescent ink, or any other available security feature which protects the document against tampering or counterfeiting, and which does not compromise the ability of the protective layer to protect the identification document against wear and the elements.

It is normally convenient to carry out the present process by printing numerous copies of the first indicium on a large area of the core layer material in the form of a sheet or web. The polyester layer and the image-receiving layer or layers can then be provided on the core layer using polyester films of substantially the same size and shape as that of the core layer material. The completed sheet or web can then be divided into a plurality of sections each bearing one copy of the first indicium to provide a plurality of "blank" identification documents ready for dye diffusion thermal transfer printing. The aforementioned steps will normally be carried out at a secure central production facility and the resultant "blank" documents shipped as required to a plurality of document issue stations at which variable data are applied to the image-receiving layers of the identification documents and the protective layers are laminated over the image-receiving layers.

The identification documents of the present invention may be manufactured in any desired size. Typically, such documents will range in size from standard business card size (47.6×85.7 mm) up to identification booklet documents (127×177.8 mm), and will have thicknesses in the range of from about 0.3 to about 1.3 mm. Most commonly, credit cards and driving licenses produced in accordance with the present invention will conform to all the requirements of ISO 7810, 1985 and will thus be of the CR-80 size, 85.47–85.73 mm wide, 53.92–54.03 mm high and 0.69–0.84 mm thick. The corners of such CR-80 documents should be rounded with a radius of 2.88–3.48 mm and care should be taken to avoid misalignment between the rounded corners and the straight edges of the card. The maximum distance from a flat, rigid plate to any portion of the convex surface of an unembossed card should not be greater than 1.5 mm, including the thickness of the card.

The prior art central issue identification document (card), generally designated 10, shown in FIG. 1 of the accompanying drawings, comprises a white, opaque polyolefin core layer 12, which is printed, at the central location from which the cards are issued, with both fixed and variable indicia 14 by means of laser printing techniques. The printed core layer 12 is then sandwiched between two polymer layers 16, formed from a transparent plastic, each polymer layer 16 being secured to the core layer 12 by a layer 18 of adhesive, which may a hot melt, ultraviolet or thermally cured adhesive. One or both of the adhesive layers 18 may be provided with a low cohesivity layer, security ink or other security feature, as indicated schematically at 20. The polymer layers 16 serve to protect the core layer 12 and the fixed and variable indicia printed thereon.

Figure 2:
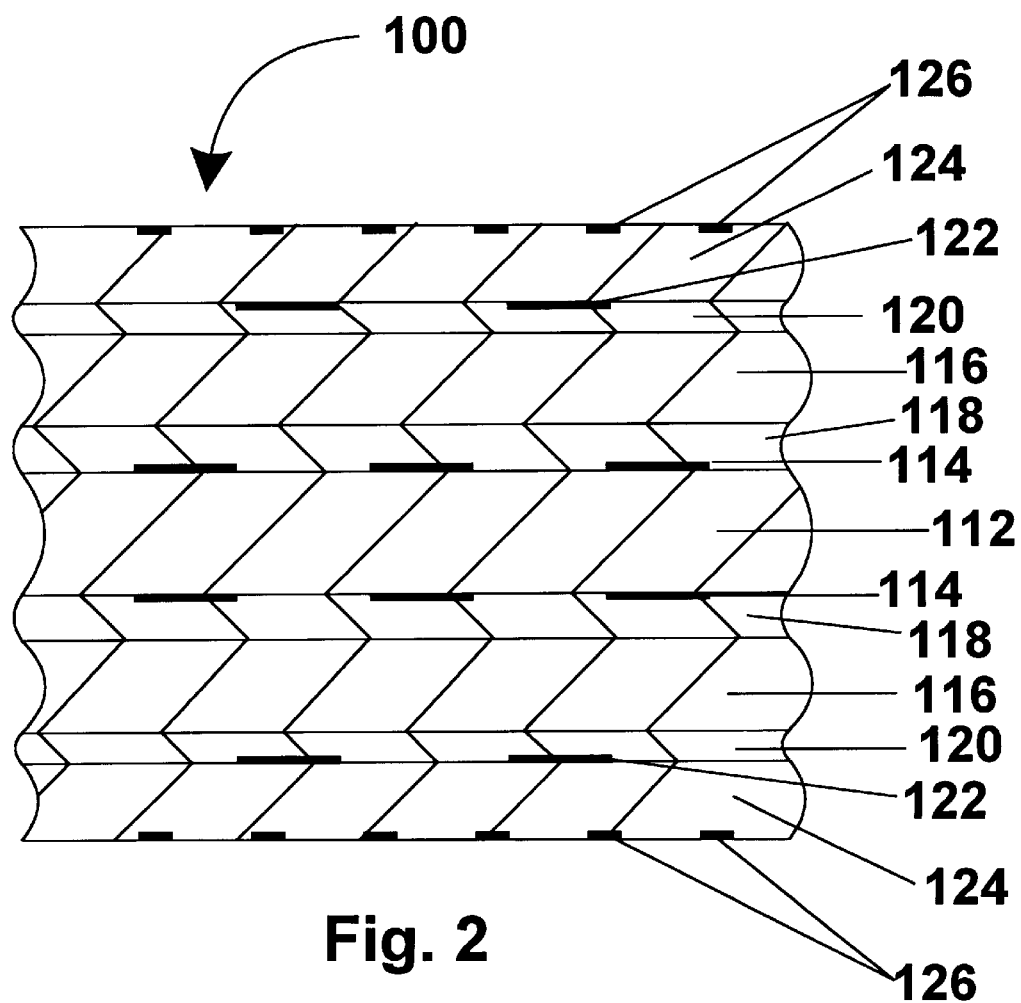
FIG. 2 shows schematically a cross-section through a finished over-the-counter identification document of the present invention which has an appearance essentially identical to that of the central issue identification document shown in FIG. 1.

FIG. 2 of the accompanying drawings shows a schematic cross-section through an over-the-counter identification document (card) of the present invention which is designed to have substantially the same appearance as the central issue card shown in FIG. 1. The document, generally designated 100, comprises a core layer 112 formed of an opaque white reflective polyolefin (preferably the aforementioned TESLIN sheet) and printed on both surfaces with fixed indicia 114.

The printed core layer 112 is sandwiched between two polymer layers 116 formed from an amorphous or biaxially oriented polyester or other optically clear plastic such as polycarbonate. Each of these polymer layers 116 is fixedly secured to the core layer 112 by a layer 118 of adhesive. On the opposed side of each polymer layer 116 from the core 112 is provided an image-receiving layer 120 suited to the acceptance of printed image or portrait or other variable indicia (indicated schematically at 122) by dye diffusion thermal transfer methods. The material used to form the image-receiving layers 120 is chosen so as to be immiscible with the polymer system of the donor sheet used, in accordance with the aforementioned U.S. Pat. No. 5,334,573.

After the variable indicia have been printed on the image-receiving layers 120, a biaxially oriented polyester or other optically clear durable plastic protective layer 124 is applied to protect the variable indicia and prevent bleeding of dye from the image-receiving layers 120. The protective layer 124 may be provided with a low cohesivity layer, security ink or other security feature, as indicated schematically at 126.

The following Examples are now given, though by way of illustration only, to show detailed of specific preferred reagents, conditions and techniques used to prepare identification documents of the present invention.

EXAMPLE 1

To prepare a medium comprising a polymer layer and an image-receiving layer, an 11.1% w/v solution of poly (caprolactone) (PCL) in chloroform was coated with a #20 Meyer rod on to 4, 6 and 10 mil (101, 152 and 254 µm respectively) thick optically clear poly(ethylene terephthalate) (Melinex (Registered Trade Mark) film from ICI Films Division, England) and poly(ethylene terephthalate)glycol (Transilwrap (Registered Trade Mark) TXP film from Transilwrap, Inc., Richmond, Ind.). The films were then dried in an oven at 100–120° F. for 10 minutes to produce a dry PCL image-receiving layer with a thickness of 2 µm.

To prepare an identification document of the present invention, a Teslin film was printed using a color laser printer, and laminated under heat and pressure between two thicknesses of the PCL-coated film prepared as described above, so that the PCL layers were on the outer surface of the laminated film, and the laminated film was then cut into CR-80 sized cards. These cards were thermally printed using a dye diffusion thermal transfer printer and donor ribbons having a poly(methyl methacrylate) base. Good quality printing was achieved without sticking of the donor sheets to the identification card.

EXAMPLE 2

Example 1 was repeated except that the PCL was replaced by poly(2,2-dimethyl-1,3-propylene succinate) (PDPS), poly(ethylene adipate) (PEA) or poly(vinyl chloride) (PVC); these image-receiving layers were deposited from 5–20% w/v solutions in chloroform or methyl ethyl ketone, at dry thicknesses of 2–5 μm. All these polymers produced excellent dye densities upon dye diffusion thermal printing in the same manner as in claim 1, with no sticking of the identification card to the donor ribbons.

From the foregoing, it will be seen that the present invention provides an over-the-counter identification document which affords significant improvements in durability (specifically, crack resistance, chemical resistance and resistance to combinations of heat and humidity) and security (by offering the same security features which have previously only been available in central issue identification documents) as compared with the prior art OTC identification documents described above. The combined improvement of durability and security, which are materials and process dependent, offered by the present OTC identification documents have hitherto been available only in a central issue identification document. Furthermore, the present invention can provide a durable and secure identification document which is instantly produced over-the-counter and which is substantially identical in appearance, durability and security with similar identification documents created by known central issue methods.

What is claimed is:

1. An identification document comprising:

a core layer bearing at least one indicium thereon;

two layers of a substantially transparent polymer fixed to the core layer on opposed sides thereof; and at least one image-receiving layer capable of being imaged by dye diffusion thermal transfer, the image-receiving layer being fixed to one of the layers of substantially transparent polymer on the side thereof remote from the core layer.

2. An identification document according to claim 1 comprising two image-receiving layers, one image-receiving layer being fixed to each layer of substantially transparent polymer on the side thereof remote from the core layer.

3. An identification document according to claim 1 wherein the core layer is formed from a silica-filled polyolefin.

4. An identification document according to claim 1 wherein the substantially transparent polymer is a polyester or a polycarbonate.

5. An identification document according to claim 1 wherein the polyester is an amorphous or biaxially oriented poly(ethylene terephthalate).

6. An identification document according to claim 1 having at least one second indicium printed by dye diffusion thermal transfer on the image-receiving layer, said second indicium being different from the first indicium on the core layer, the identification document further comprising a protective layer fixed to the image-receiving layer and superposed over the indicium thereon.

7. A process for preparing an identification document, which process comprises:

forming at least one first indicium upon a core layer;

affixing to the indicium-carrying core layer two layers of substantially transparent polymer, one of said layers being affixed to each surface of the core layer;

providing, on one of the layers of substantially transparent polymer, on the side thereof remote from the core layer, an image-receiving layer capable of being imaged by dye diffusion thermal transfer;

printing by dye diffusion thermal transfer at least one second indicium on the image-receiving layer, said second indicium being different from the first indicium on the core layer; and affixing a protective layer over the image-receiving layer bearing the second indicium.

8. A process according to claim 7 wherein two image-receiving layers are provided on the layers of substantially transparent polymer, one image-receiving layer being provided on each layer of substantially transparent polymer on the side thereof remote from the core layer.

9. A process according to claim 7 wherein the core layer is formed from a silica-filled polyolefin.

10. A process according to claim 7 wherein the substantially transparent polymer is a polyester or a polycarbonate.

11. A process according to claim 10 wherein the polyester is an amorphous or biaxially oriented poly(ethylene terephthalate).

12. A process according to claim 7 wherein a plurality of copies of the first indicium are formed upon the core layer, the two layers of substantially transparent polymer are affixed to the core layer and the at least one image-receiving layer is provided thereon, the core layer and affixed substantially transparent polymer and image-receiving layers are divided into a plurality of sections each bearing one copy of the first indicium, and at least one of the resultant sections has the second indicium formed on its image-receiving layer and a protective layer affixed over the image-receiving layer bearing the second indicium.

* * * * *